(12) United States Patent
Yang

(10) Patent No.: US 11,039,348 B2
(45) Date of Patent: Jun. 15, 2021

(54) METHOD FOR TRANSMITTING DATA, NETWORK DEVICE AND TERMINAL DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/845,621

(22) Filed: Apr. 10, 2020

(65) Prior Publication Data

US 2020/0245201 A1 Jul. 30, 2020

Related U.S. Application Data

(63) Continuation of application No. PCT/CN2017/108199, filed on Oct. 28, 2017.

(51) Int. Cl.
*H04W 36/14* (2009.01)
*H04W 36/00* (2009.01)
(Continued)

(52) U.S. Cl.
CPC ....... *H04W 36/0058* (2018.08); *H04W 36/08* (2013.01); *H04W 36/38* (2013.01); *H04W 92/20* (2013.01)

(58) Field of Classification Search
CPC . H04W 36/0058; H04W 36/08; H04W 36/38; H04W 92/20
See application file for complete search history.

(56) References Cited

U.S. PATENT DOCUMENTS

| 10,667,160 B2* | 5/2020 | Bergstrom | H04W 36/0069 |
| 2013/0088985 A1* | 4/2013 | Park | H04W 48/16 370/252 |

(Continued)

FOREIGN PATENT DOCUMENTS

| CN | 105338585 A | 2/2016 |
| CN | 105517080 A | 4/2016 |

(Continued)

OTHER PUBLICATIONS

International Search Report dated Jun. 28, 2018 from International Application No. PCT/CN2017/108199.

(Continued)

*Primary Examiner* — Jay P Patel

(57) ABSTRACT

Provided are a method for transmitting data, a network device and a terminal device. The method comprises: a first network device obtaining a first measurement result, the first measurement result being used to reflect the signal quality respectively between a terminal device and the first network device as well as a second network device, which belong to a first communications system; the first network device obtaining a second measurement result, the second measurement result being used to reflect the signal quality respectively between the terminal device and a third network device and a fourth network device, which belong to a second communications system, wherein the first communications system and the second communications system are different communications systems; the first network device sending the first measurement result and the second measurement result to the second network device.

17 Claims, 3 Drawing Sheets

(51) Int. Cl.
*H04W 36/08* (2009.01)
*H04W 36/38* (2009.01)
*H04W 92/20* (2009.01)

(56) References Cited

U.S. PATENT DOCUMENTS

| | | | |
|---|---|---|---|
| 2014/0307708 A1* | 10/2014 | Son | H04W 36/0055 370/331 |
| 2015/0131571 A1* | 5/2015 | Fodor | H04W 72/04 370/329 |
| 2015/0237516 A1* | 8/2015 | Michel | H04W 24/02 370/252 |
| 2015/0249972 A1* | 9/2015 | You | H04L 5/0035 370/254 |
| 2016/0353340 A1* | 12/2016 | Yang | H04W 36/0058 |
| 2017/0034709 A1 | 2/2017 | Hapsari et al. | |
| 2017/0094574 A1* | 3/2017 | Singh | H04W 36/245 |
| 2017/0188253 A1* | 6/2017 | Bergstrom | H04W 24/08 |
| 2017/0188285 A1 | 6/2017 | Moon et al. | |
| 2017/0289855 A1 | 10/2017 | Xu et al. | |
| 2017/0303156 A1* | 10/2017 | Kimura | H04J 11/0036 |
| 2018/0041936 A1* | 2/2018 | Kim | H04W 4/70 |
| 2018/0054796 A1* | 2/2018 | Edge | H04W 4/02 |
| 2018/0077660 A1* | 3/2018 | Ly | H04W 24/10 |
| 2018/0124677 A1* | 5/2018 | He | H04W 40/12 |
| 2018/0132158 A1* | 5/2018 | Tseng | H04W 36/0088 |
| 2018/0184304 A1* | 6/2018 | Frenger | H04W 36/32 |
| 2018/0213424 A1* | 7/2018 | Du | H04L 5/0048 |
| 2018/0227874 A1* | 8/2018 | Sirotkin | H04W 88/08 |
| 2018/0295572 A1* | 10/2018 | Bhattacharya | H04B 17/318 |
| 2018/0376484 A1* | 12/2018 | Beale | H04W 24/10 |
| 2019/0029073 A1* | 1/2019 | Yiu | H04W 76/19 |
| 2019/0058993 A1* | 2/2019 | Yu | H04W 12/06 |
| 2019/0182693 A1* | 6/2019 | Zhang | H04W 36/30 |
| 2019/0182743 A1* | 6/2019 | Wong | H04W 36/30 |
| 2019/0215761 A1* | 7/2019 | Hirata | H04W 8/005 |
| 2019/0273583 A1* | 9/2019 | Ugurlu | H04B 7/0408 |
| 2020/0015133 A1* | 1/2020 | Yang | H04W 24/10 |
| 2020/0067793 A1* | 2/2020 | Dribinski | H04W 36/00837 |
| 2020/0100128 A1* | 3/2020 | Fan | H04W 24/10 |
| 2020/0100150 A1* | 3/2020 | da Silva | H04W 76/28 |
| 2020/0120756 A1* | 4/2020 | Wang | H04W 24/10 |
| 2020/0128448 A1* | 4/2020 | Muller | H04W 88/06 |
| 2020/0137656 A1* | 4/2020 | Kim | H04W 4/70 |
| 2020/0145863 A1* | 5/2020 | Yang | H04W 16/28 |
| 2020/0169340 A1* | 5/2020 | Hwang | H04B 17/327 |

FOREIGN PATENT DOCUMENTS

| | | |
|---|---|---|
| CN | 105517086 A | 4/2016 |
| CN | 105530077 A | 4/2016 |
| RU | 2619889 C2 | 5/2017 |
| WO | 2014169748 A1 | 10/2014 |

OTHER PUBLICATIONS

Extended European Search Report for EP Application 17930096.7 dated Jul. 28, 2020.
3GPP TSG-RAN WG2 #99bis; R2-1712045; Prague, Czech Republic, Oct. 9-13, 2017.
3GPP TSG-RAN2#99bis; Oct. 9-13, 2017; Prague, Czech; R2-1711753.
Russia First Office Action with English Translation of RU Application 2020113812/07(023291) dated Nov. 11, 2020.
European Examination Report for EP Application 17930096.7 dated Apr. 8, 2021. (7 pages).

* cited by examiner

METHOD FOR TRANSMITTING DATA, NETWORK DEVICE AND TERMINAL DEVICE

CROSS-REFERENCE TO RELATED APPLICATION(S)

This application is a continuation application of International Application No. PCT/CN2017/108199, filed on Oct. 28, 2017, the entire disclosure of which is hereby incorporated by reference.

TECHNICAL FIELD

Implementations of the present disclosure relate to the communication field, in particular to a method for transmitting data, a network device, and a terminal device.

BACKGROUND

At present, in discussions of measurement contents of the communication standards organization, various companies discuss that in a dual-connectivity (DC) scenario, as shown in FIG. 1, a terminal device 110 is connected to a first network device 130 under a first communication system and a third network device 120 under a second communication system, for example, the first network device 130 is a network device under long term evolution (LTE), and the third network device 120 is a network device under new radio (NR).

However, when the first network device 130 receives a measurement result of an A-series event (i.e., a measurement reporting event within a LTE network) and triggers the first network device to send a switch request to a second network device (not shown in FIG. 1) under the first communication system to switch the terminal device 110 from the first network device 130 to the second network device, whether it is necessary to change the third network device 120. This is a technical problem that needs to be solved urgently in the field.

SUMMARY

A method for transmitting data, a network device, and a terminal device are provided.

In a first aspect, a method for transmitting data is provided and comprises: obtaining, by a first network device, a first measurement result, wherein the first measurement result is used for reflecting signal quality between a terminal device and the first network device and/or between the terminal device and a second network device respectively, and the first network device and the second network device belong to a first communication system; obtaining, by first network device, a second measurement result, wherein the second measurement result is used for reflecting signal quality between the terminal device and a third network device and/or between the terminal device and a fourth network device respectively, the third network device and the fourth network device belong to a second communication system, and the first communication system and the second communication system are different communication systems; and sending, by the first network device, the first measurement result and the second measurement result to the second network device.

In a second aspect, a method for transmitting data is provided and comprises: receiving, by a second network device, a first measurement result and a second measurement result sent by a first network device, wherein the first measurement result is used for reflecting signal quality between a terminal device and the first network device and/or between the terminal device and the second network device respectively, the first network device and the second network device belong to a first communication system, the second measurement result is used for reflecting signal quality between the terminal device and a third network device and/or between the terminal device and a fourth network device respectively, the third network device and the fourth network device belong to a second communication system, and the first communication system and the second communication system are different communication systems; and sending, by the second network device, change information of the third network device and/or the fourth network device to the first network device.

In a third aspect, a method for transmitting data is provided and comprises: obtaining, by a terminal device, a first measurement result, wherein the first measurement result is used for reflecting signal quality between the terminal device and a first network device and/or between the terminal device and a second network device respectively, and the first network device and the second network device belong to a first communication system; obtaining, by the terminal device, a second measurement result, wherein the second measurement result is used for reflecting signal quality between the terminal device and a third network device and/or between the terminal device and a fourth network device respectively, the third network device and the fourth network device belong to a second communication system, and the first communication system and the second communication system are different communication systems; and sending, by the terminal device, the first measurement result and the second measurement result to the first network device.

In a fourth aspect, a network device is provided and comprises a transceiving unit for performing the method implementation in the first aspect and any one of the possible implementations of the first aspect.

In a fifth aspect, a network device is provided and comprises a transceiver used for performing the method implementation in the first aspect and any one of the possible implementations of the first aspect.

In a sixth aspect, a network device is provided and comprises a transceiving unit for performing the method implementation in the second aspect and any one of the possible implementations of the second aspect.

In a seventh aspect, a network device is provided and comprises a transceiver used for performing the method implementation in the second aspect and any one of the possible implementations of the second aspect.

In an eighth aspect, a terminal device is provided and comprises a transceiving unit for performing the method implementation in the third aspect and any one of the possible implementations of the third aspect.

In a ninth aspect, a terminal device is provided and comprises a transceiver used for performing the method implementation in the third aspect and any one of the possible implementations of the third aspect.

In a tenth aspect, a computer readable medium used for storing a computer program is provided, and the computer program comprises instructions used for executing the method implementation of the first aspect, the second aspect, or the third aspect.

In an eleventh aspect, a computer chip is provided. The computer chip comprises an input interface, an output interface, at least one processor, and a memory. The at least one processor is used for executing codes in the memory, and when the codes are executed, the at least one processor may implement various processes executed by network devices in the method for transmitting data in the first aspect or second aspect.

In a twelfth aspect, a computer chip is provided. The computer chip comprises an input interface, an output interface, at least one processor, and a memory. The at least one processor is used for executing codes in the memory, and when the codes are executed, the at least one processor may implement various processes executed by the terminal device in the method for transmitting data in the third aspect and various implementations of the third aspect.

In a thirteenth aspect, a communication system is provided and comprises the above network device and the above terminal device.

DETAILED DESCRIPTION

Figure 1:
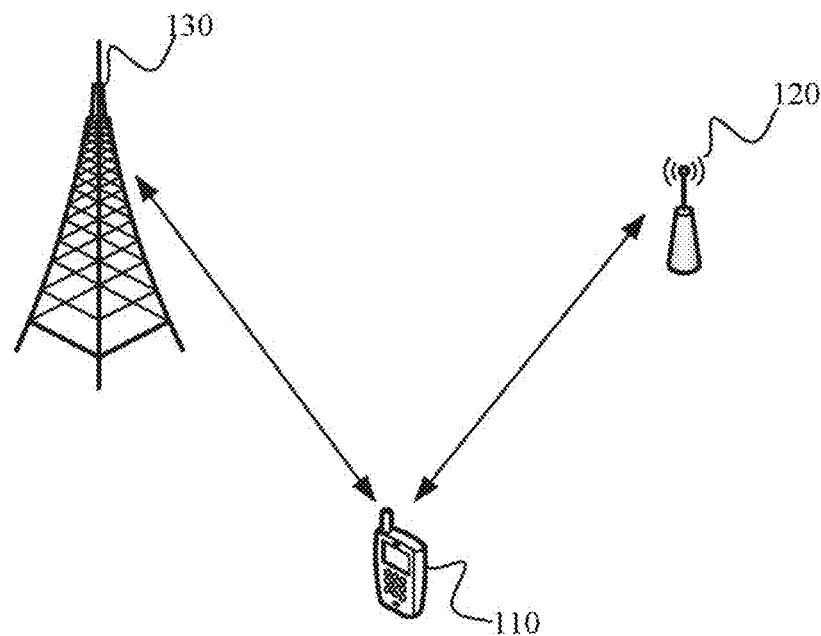
FIG. 1 is an example of an application scenario of the present disclosure.

FIG. 1 is a schematic diagram of an application scenario according to an implementation of the present disclosure.

As shown in FIG. 1, a terminal device 110 is connected to a first network device 130 under a first communication system and a third network device 120 under a second communication system. For example, the first network device 130 is a network device under Long Term Evolution (LTE), and the third network device 120 is a network device under New Radio (NR).

However, when the first network device 130 receives a measurement result of an A-series event (i.e., a measurement reporting event within a LTE network) and triggers the first network device to send a switch request to a second network device (not shown in FIG. 1) under the first communication system to switch the terminal device 110 from the first network device 130 to the second network device, whether it is necessary to change the third network device 120.

An implementation of the present disclosure provides a method for transmitting data, which can enable the second network device to accurately determine whether to change the third network device while determining whether to switch the first network device.

It should be understood that FIG. 1 is an example of a scenario of an implementation of the present disclosure, and the implementation of the present disclosure is not limited to that shown in FIG. 1.

For example, a communication system to which the implementation of the present disclosure is adapted may comprise at least a plurality of network devices under the first communication system and/or a plurality of network devices under the second communication system.

For example, the first communication system and the second communication system in the implementation of the present disclosure are different, but specific categories of the first communication system and the second communication system are not limited. For example, the first communication system and the second communication system may be various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Time Division Duplex (TDD) system, a Universal Mobile Telecommunication System (UMTS).

In addition, the present disclosure describes various implementations in combination with network devices (the first to fourth network devices) and terminal devices.

A network device may refer to any entity on a network side for sending or receiving signals. For example, the network device may be a user device of Machine Type Communication (MTC), a Base Transceiver Station (BTS) in GSM or CDMA, a NodeB in WCDMA, an Evolution Node B (eNB or NodeB) in LTE, a base station device in a 5G network, etc.

The terminal device 110 may be any terminal device. Specifically, the terminal device may communicate with one or more core networks through a radio access network (RAN), and may also be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. For example, the terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, an on-board device, a wearable device, a terminal device in a 5G network or the like.

Figure 2:
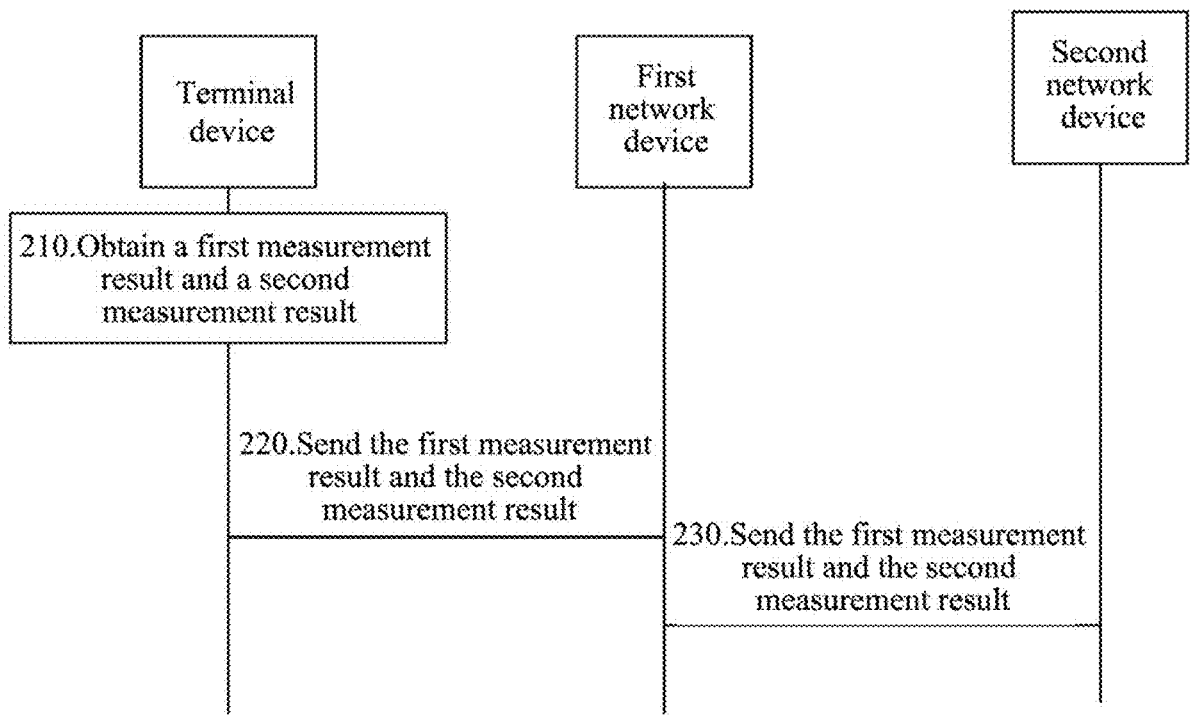
FIG. 2 is a schematic flowchart of a method for transmitting data according to an implementation of the present disclosure.

FIG. 2 is a schematic flowchart of a method for transmitting data according to an implementation of the present disclosure.

As shown in FIG. 2, the method comprises acts 210-230.

In 210, a terminal device obtains a first measurement result and a second measurement result.

In 220, the terminal device sends the first measurement result and the second measurement result to a first network device.

In 230, the first network device sends the first measurement result and the second measurement result to a second network device.

In short, the terminal device determines the first measurement result and the second measurement result and sends the first measurement result and the second measurement result to the first network device, and the first network device sends the first measurement result and the second measurement result to the second network device.

In order to facilitate understanding of the technical scheme of the implementation of the present disclosure, the first measurement result and the second measurement result related to the implementation of the present disclosure will be described below.

The first measurement result may be used for reflecting signal quality between the terminal device and the first network device and between the terminal device and the second network device respectively. In other words, the first measurement result comprises information for reflecting the signal quality between the terminal device and the first network device measured by the terminal device, and information for reflecting the signal quality between the terminal device and the second network device measured by the terminal device. In at least one implementation, the first measurement result may be used by the first network device to determine whether to switch the terminal device from the first network device to the second network device.

In addition, the second measurement result is used for reflecting signal quality between the terminal device and a third network device and between the terminal device and a fourth network device, respectively. In other words, the second measurement result comprises information for reflecting the signal quality between the terminal device and the third network device measured by the terminal device, and information for reflecting the signal quality between the terminal device and the fourth network device measured by the terminal device. In at least one implementation, after the third network device obtains the second measurement result, the second measurement result may be used by the first network device or the second network device to determine whether to change the third network device and/or the fourth network device.

In summary, the method for transmitting data according to the implementation of the present disclosure can enable the terminal device to know whether the third network device under the second communication system needs to be changed when a network device under the first communication system needs to be changed, thereby improving the communication environment and enhancing user experience.

It should be understood that in the implementation of the present disclosure, the first network device and the second network device belong to the first communication system, the third network device and the fourth network device belong to the second communication system, and the first communication system and the second communication system are different communication systems.

Implementation of the terminal device sending the first measurement result and the second measurement result to the first network device in the implementation of the present disclosure will be described below.

In an implementation, the first measurement result is a measurement result triggered by the terminal device based on an A-series event.

Specifically, the first measurement result may be a measurement result triggered by an A-series event (A1/A2/A3/A4/A5) in LTE. For example, taking an A3 event as an example, the A3 event means that quality of an intra-frequency/inter-frequency neighbor cell is higher than quality of a serving cell by a threshold, and the A3 is used for initiating an intra-frequency/inter-frequency switch request.

More specifically, a trigger condition is: Mn+Ofn+Ocn-Hys>Ms+Ofs+Ocs+Off.

Mn represents a measurement result of a neighbor cell; Ms represents a measurement result of a serving cell; Ofn represents a specific frequency offset of a frequency of the neighbor cell; Ofs represents a specific frequency offset of a frequency of the serving cell, Ofn and Ofs may be generally ignored when the serving cell and the neighbor cell are intra-frequency. Ocn represents a specific cell offset of the neighbor cell; Ocs represents a specific cell offset of the serving cell; Hys represents amplitude hysteresis of intra-frequency switch, which is a hysteresis parameter of the event A3; Off represents an intra-frequency switch offset, which is an offset parameter of the event A3. When a positive value is obtained, difficulty of event triggering is increased, and switch is delayed. When a negative value is obtained, the difficulty of event triggering is reduced, and switch is performed in advance.

In an implementation of the present disclosure, when the terminal device satisfies a triggering condition of the A3 event, a first measurement result is sent to the first network device.

It should be understood that the above A3 event is only an example explanation for the terminal device reporting the first measurement result in the implementation of the present disclosure, and the implementation of the present disclosure is not limited thereto.

The following is description of implementation of the terminal device reporting the second measurement result according to an implementation of the present disclosure.

In an implementation, the terminal device sends the second measurement result to the first network device simultaneously when sending the first measurement result to the first network device.

For example, if the first measurement result is a measurement result triggered by the terminal device based on an A-series event. That is, when the terminal device satisfies a trigger condition of the A-series event, the terminal device sends the first measurement result and the second measurement result to the first network device.

In another implementation, the second measurement result may be a measurement result triggered by the terminal device based on a B-series event. In other words, the terminal device sends the first measurement result to the first network device when the terminal satisfies a trigger condition of the B-series event, for example, a B1 event or a B2 event.

In another implementation, before sending the first measurement result and the second measurement result to the first network device, the terminal device may receive indication information sent by the first network device, the indication information is used for instructing the terminal device to send the second measurement result to the first network device. Thus, after receiving the indication information, the terminal device may send the second measurement result to the first network device.

It should be understood that, in an implementation of the present disclosure, the second measurement result comprises a measurement result for all or part of cells under the third network device, and/or a measurement result for all or part of cells under the fourth network device. Further, the fourth network device may be adjacent to the third network device.

In addition, in an implementation of the present disclosure, the terminal device may receive a notification message sent by the first network device, and the notification message is used for notifying the terminal device of change information of the third network device and/or the fourth network device. Furthermore, the terminal device changes the third network device and/or the fourth network device according to the notification message.

In an implementation of the present disclosure, a processing procedure of the first network device receiving the first measurement result and the second measurement result will be described below from the perspective of the first network device.

In short, the first network device obtains the first measurement result and the second measurement result, and the first network device sends the first measurement result and the second measurement result to the second network device.

However, it should be noted that, in the implementation of the present disclosure, after receiving the first measurement result and the second measurement result, the first network device may not only forward the first measurement result and the second measurement result to the second network device, but also determine whether to switch the terminal device from the first network device to the second network device according to the first measurement result, or may send a change suggestion regarding the third network device to the second network device according to the second measurement result.

For example, the first network device may send a change request to the second network device, and the change request is used for requesting the second network device to change a serving device of the terminal device from the third network device to the fourth network device, or the change request is used for requesting the second network device to release the third network device or add the fourth network device, or the change request is used for requesting the second network device to change a serving cell of the terminal device within a cell of the third network device; and then the first network device receives a response message for the change request sent by the second network device.

For another example, the first network device sends a switch request to the second network device. The switch request is used for requesting the second network device to switch the terminal device from the first network device to the second network device, and the switch request comprises the first measurement result and the second measurement result. The first network device receives a response message for the switch request sent by the second network device.

In an implementation of the present disclosure, for a second network device, after receiving the first measurement result and the second measurement result sent by the first network device, the second network device may determine whether to switch the terminal device from the first network device to the second network device according to the first measurement result and/or the switch request mentioned in the above implementation, or may determine whether to change the third network device and/or the fourth network device according to the second measurement result and the change request mentioned in the above implementation, for example, to delete the third network device, for another example, to add the fourth network device.

Figure 3:
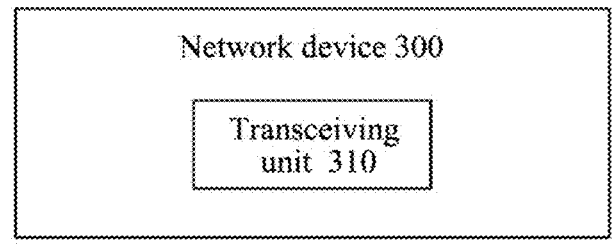
FIG. 3 is a schematic block diagram of a network device according to an implementation of the present disclosure.

FIG. 3 is a schematic block diagram of a network device according to an implementation of the present disclosure.

As shown in FIG. 3, there is provided a network device comprising a transceiving unit 310.

The transceiving unit 310 is configured to obtain a first measurement result, wherein the first measurement result is used for reflecting signal quality between a terminal device and the network device and between the terminal device and a second network device respectively, and the network device and the second network device belong to a first communication system; obtain a second measurement result, wherein the second measurement result is used for reflecting signal quality between the terminal device and a third network device and between the terminal device and a fourth network device respectively, the third network device and the fourth network device belong to a second communication system, and the first communication system and the second communication system are different communication systems; and send the first measurement result and the second measurement result to the second network device.

In at least one implementation, the first measurement result comprises a measurement result triggered by the terminal device based on an A-series event.

In at least one implementation, the transceiving unit 310 is specifically configured to receive the first measurement result and the second measurement result simultaneously.

In at least one implementation, the second measurement result is a measurement result triggered by the terminal device based on a B-series of event.

In at least one implementation, the transceiver unit 310 is specifically configured to send indication information to the terminal device before obtaining the second measurement result, wherein the indication information is used for instructing the terminal device to send the second measurement result to the network device; and receive the second measurement result sent by the terminal device after sending the indication information.

In at least one implementation, the second measurement result comprises a measurement result for all or part of cells under the third network device, and/or a measurement result for all or part of cells under the fourth network device.

In at least one implementation, the fourth network device is adjacent to the third network device.

In at least one implementation, the transceiving unit 310 is further configured to send a change request to the second network device, wherein the change request is used for requesting the second network device to change a serving device of the terminal device from the third network device to the fourth network device, or the change request is used for requesting the second network device to release the third network device or add the fourth network device, or the change request is used for requesting the second network device to change a serving cell of the terminal device within a cell of the third network device; and receive a response message for the change request sent by the second network device.

In at least one implementation, the transceiving unit 310 is further configured to send a switch request to the second network device, wherein the switch request is used for requesting the second network device to switch the terminal device from the network device to the second network device, the switch request comprises the first measurement result and the second measurement result; and receive a response message for the switch request sent by the second network device.

In at least one implementation, the transceiving unit 310 is further configured to send a notification message to the terminal device, wherein the notification message is used for notifying the terminal device of change information of the third network device and/or the fourth network device.

In an implementation of the present disclosure, another network device is provided.

Specifically as shown in FIG. 3, the network device comprises a transceiving unit 310. The transceiving unit 310 is configured to receive a first measurement result and a second measurement result sent by a first network device, wherein the first measurement result is used for reflecting signal quality between a terminal device and the first network device and between the terminal device and the network device respectively, the first network device and the network device belong to a first communication system, the second measurement result is used for reflecting signal quality between the terminal device and a third network device and between the terminal device and a fourth network device respectively, the third network device and the fourth network device belong to a second communication system, and the first communication system and the second communication system are different communication systems; and send change information of the third network device and/or the fourth network device to the first network device.

In at least one implementation, the second measurement result comprises a measurement result for all or part of cells under the third network device, and/or a measurement result for all or part of cells under the fourth network device.

In at least one implementation, the fourth network device is adjacent to the third network device.

In at least one implementation, the transceiving unit 310 is further configured to receive a change request sent by the first network device, wherein the change request is used for requesting the second network device to change a serving device of the terminal device from the third network device to the fourth network device, or the change request is used for requesting the second network device to release the third network device or add the fourth network device, or the change request is used for requesting the network device to change a servicing cell of the terminal device within a cell of the third network device; generate a response message for the change request according to the change request and/or the second measurement result; and send the response message for the change request to the first network device.

In at least one implementation, the transceiving unit 310 is further configured to receive a switch request sent by the first network device, wherein the switch request is used for requesting the network device to switch the terminal device from the first network device to the network device, the switch request comprises the first measurement result and the second measurement result; and send a response message for the switch request to the first network device.

Figure 4:
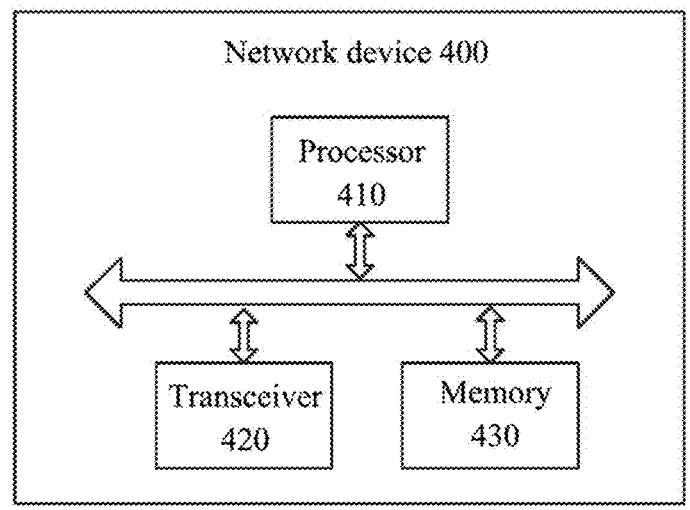
FIG. 4 is a schematic diagram of another network device according to an implementation of the present disclosure.

It should be noted that the transceiving unit 310 or a transceiving unit 510 may be implemented by a transceiver. As shown in FIG. 4, a network device 400 may comprise a processor 410, a transceiver 420, and a memory 430. The memory 430 may be configured to store indication information, or may be configured to store codes, instructions, etc., executed by the processor 410. Various components in the network device 400 are connected by a bus system. The bus system comprises a power bus, a control bus, and a status signal bus in addition to a data bus.

The network device 400 shown in FIG. 4 can implement the various processes implemented by network devices in the method implementation of FIG. 2 described above. In order to avoid duplication, the details will not be repeated here.

Figure 5:
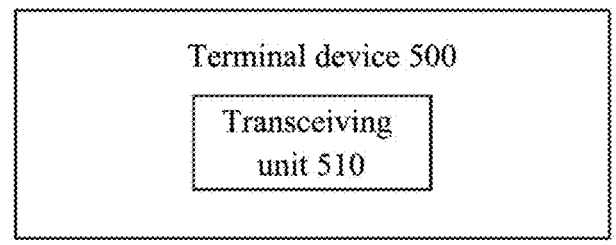
FIG. 5 is a schematic block diagram of a terminal device according to an implementation of the present disclosure.

FIG. 5 is a schematic block diagram of a terminal device according to an implementation of the present disclosure.

As shown in FIG. 5, a terminal device 500 comprises a transceiving unit 510. The transceiving unit 510 is configured to obtain a first measurement result, wherein the first measurement result is used for reflecting signal quality between the terminal device and a first network device and between the terminal device and a second network device respectively, and the first network device and the second network device belong to a first communication system; obtain a second measurement result, wherein the second measurement result is used for reflecting signal quality between the terminal device and a third network device and between the terminal device and a fourth network device respectively, the third network device and the fourth network device belong to a second communication system, and the first communication system and the second communication system are different communication systems; and send the first measurement result and the second measurement result to the first network device.

In at least one implementation, the first measurement result is a measurement result triggered by the terminal device based on an A-series event.

In at least one implementation, the transceiving unit 510 is specifically configured to send the second measurement result to the first network device simultaneously when sending the first measurement result to the first network device.

In at least one implementation, the second measurement result is a measurement result triggered by the terminal device based on a B-series event.

In at least one implementation, the transceiving unit 510 is specifically configured to receive indication information sent by the first network device before sending the first measurement result and the second measurement result to the first network device, wherein the indication information is used for instructing the terminal device to send the second measurement result to the first network device; and send the second measurement result to the first network device after receiving the indication information.

In at least one implementation, the second measurement result comprises a measurement result for all or part of cells under the third network device, and/or a measurement result for all or part of cells under the fourth network device.

In at least one implementation, the fourth network device is adjacent to the third network device.

In at least one implementation, the transceiving unit 510 is further configured to receive a notification message sent by the first network device, wherein the notification message is used for notifying the terminal device of change information of the third network device and/or the fourth network device; and change the third network device and/or the fourth network device according to the notification message.

Figure 6:
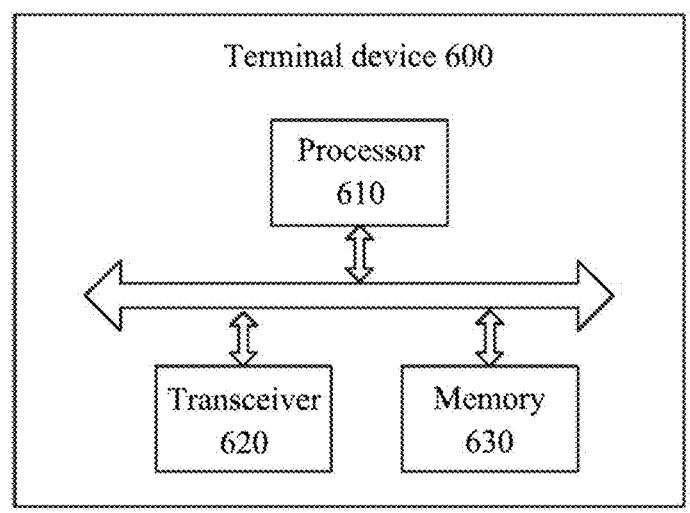
FIG. 6 is a schematic block diagram of another terminal device according to an implementation of the present disclosure.

It should be noted that the transceiving unit 510 may be implemented by a transceiver. As shown in FIG. 6, a terminal device 600 may comprise a processor 610, a transceiver 620, and a memory 630. The memory 630 may be configured to store indication information, or may be configured to store codes, instructions, etc., executed by the processor 610. Various components in the terminal device 600 are connected by a bus system. The bus system comprises a power bus, a control bus, and a status signal bus in addition to a data bus.

The terminal device 600 shown in FIG. 6 can implement the various processes implemented by the terminal device in the method implementation of FIG. 2 described above. In order to avoid duplication, the details will not be repeated here. It should be noted that the method implementations in the implementations of the present disclosure may be applied in the processor or implemented by the processor.

In the implementation processes, each act of the method implementations in the implementations of the present disclosure may be completed by an integrated logic circuit of hardware in a processor or instructions in the form of software. More specifically, the acts of the method disclosed in connection with the implementations of the present disclosure may be directly embodied as completion through execution of a hardware decoding processor or completion through execution in a combination of hardware and software modules in a decoding processor. Software modules may be located in a typical storage medium in the art, such as, a random access memory (RAM), a flash memory, a read-only memory, a programmable read-only memory, an electrical erasable programmable memory, or a register. The storage medium is located in a memory, and a processor reads information in the memory and completes the acts of the above method in combination with its hardware.

Herein, the processor may be an integrated circuit chip with a capability for processing signals, and may implement various methods, acts, and logic block diagrams disclosed in the implementations of the present disclosure. For example, the above processor may be a general purpose processor, a digital signal processor (DSP), an application specific integrated circuit (ASIC), a field programmable gate array (FPGA), or another programmable logic device, a transistor logic device, or a discrete hardware component, or the like. Furthermore, the general purpose processor may be a microprocessor or the processor may be any conventional processor or the like.

In addition, the memory in the implementations of the present disclosure may be a transitory memory or non-transitory memory, or may comprise both the transitory memory and the non-transitory memory. The non-transitory memory may be a read-only memory (ROM), a programmable ROM (PROM), an erasable PROM (EPROM), an electrically erasable EPROM (EEPROM), or a flash memory. The transitory memory may be a Random Access Memory (RAM) which serves as an external cache. It should be understood that, the foregoing memory is an example for illustration and should not be construed as limiting. For example, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the systems and methods described herein are intended to comprise, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, the singular forms "a/an", "said", and "the" used in the implementations of the present disclosure and the appended claims are also intended to comprise plural forms unless the context clearly indicates other meanings.

For another example, depending on the context, the word "when" as used herein may be interpreted as "if" or "whether" or "while" or "in response to a determination of/that" or "in response to a detection of/that". Similarly, depending on the context, the phrase "if determined" or "if detected (a stated condition or event)" may be interpreted as "when . . . is determined" or "in response to a determination" or "when (stated condition or event) is detected" or "in response to a detection of (a stated condition or event)".

Those of ordinary skill in the art will recognize that various example units and algorithm acts described in connection with the implementations disclosed herein can be implemented in electronic hardware, or a combination of computer software and electronic hardware. Whether these functions are implemented in hardware or software depends on a specific application and design constraint of the technical solutions. One skilled in the art may use different methods to implement the described functions for each particular application, but such implementation should not be considered to be beyond the scope of implementations of the present disclosure.

Those skilled in the art may clearly understand that for convenience and conciseness of description, the specific working processes of the systems, apparatuses and units described above may refer to the corresponding processes in the aforementioned method implementations, and details are not described herein again.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the component shown as a unit may or may not be a physical unit, i.e., it may be located in one place or may be allocated over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product, the computer software product is stored in a storage medium and comprises several instructions for causing a computer device (which may be a personal computer, a server, or a network device, etc.) to perform all or parts of the acts of the methods described in various implementations of the present disclosure. The aforementioned storage medium comprises a medium capable of storing program codes, such as, a U disk, a mobile hard disk, a read-only memory (ROM), a random access memory (RAM), a magnetic disk, or an optical disk.

What are described above are merely the specific implementations of the implementations of the present disclosure, but the protection scope of the implementations of the present disclosure is not limited thereto. Any variation or substitution that can be easily conceived by a person skilled in the art within the technical scope disclosed by the implementations of the present disclosure shall be comprised within the protection scope of the implementations of the present disclosure. Therefore, the scope of protection of the implementations of the present disclosure should be subject to the scope of protection of the claims.

What is claimed is:

1. A method for transmitting data, comprising:
receiving, by a first network device, a first measurement result, wherein the first measurement result comprises a measurement result of the first network device and a measurement result of a second network device, and the first network device and the second network device belong to a first communication system;
receiving, by the first network device, a second measurement result, wherein the second measurement result comprises at least one of a measurement result of a third network device and a measurement result of a fourth network device, the third network device and the fourth network device belong to a second communication system, the first communication system is a Long Term Evolution (LTE) system, and the second communication system is a New Radio (NR) system;

sending, by the first network device, a switch request to the second network device, wherein the switch request is used for requesting the second network device to switch a terminal device from the first network device to the second network device, and wherein the switch request comprises the first measurement result and the second measurement result; and receiving, by the first network device, a response message for the switch request sent by the second network device.

2. The method according to claim 1, wherein the first measurement result is triggered by a terminal device based on an A-series event.

3. The method according to claim 1, wherein receiving, by the first network device, the second measurement result, comprises:

receiving, by the first network device, the first measurement result and the second measurement result simultaneously.

4. The method according to claim 1, wherein the second measurement result is triggered by a terminal device based on a B-series event.

5. The method according to claim 1, wherein the method further comprises:

before the first network device receives the second measurement result, sending, by the first network device, indication information to a terminal device, wherein the indication information is used for indicating the terminal device to send the second measurement result to the first network device;

wherein receiving, by the first network device, the second measurement result, comprises:

after sending the indication information, receiving, by the first network device, the second measurement result sent by the terminal device.

6. The method according to claim 1, wherein the measurement result of the third network device comprises a measurement result of all or part of cells of the third network device, and the measurement result of the fourth network device comprises a measurement result of all or part of cells of the fourth network device.

7. The method according to claim 6, wherein the fourth network device is adjacent to the third network device.

8. The method according to claim 1, wherein the method further comprises:

sending, by the first network device, a change request to the second network device, wherein the change request is used for requesting the second network device to change a serving device of a terminal device from the third network device to the fourth network device, or the change request is used for requesting the second network device to release the third network device or add the fourth network device, or the change request is used for requesting the second network device to change a serving cell of the terminal device within a cell of the third network device; and receiving, by the first network device, a response message for the change request sent by the second network device;

or, the method further comprises:

sending, by the first network device, a notification message to the terminal device, wherein the notification message is used for notifying the terminal device of change information of the third network device or the fourth network device.

9. A method for transmitting data, comprising:

receiving, by a terminal device, a first measurement result, wherein the first measurement result comprises a measurement result of a first network device and a measurement result of a second network device, and the first network device and the second network device belong to a first communication system;

receiving, by the terminal device, a second measurement result, wherein the second measurement result comprises at least one of a measurement result of a third network device and a measurement result of a fourth network device, the third network device and the fourth network device belong to a second communication system, the first communication system is a Long Term Evolution (LTE) system, and the second communication system is a New Radio (NR) system; and sending, by the terminal device, the second measurement result to the first network device simultaneously when sending the first measurement result to the first network device.

10. The method according to claim 9, wherein the first measurement result is triggered by the terminal device based on an A-series event.

11. The method according to claim 9, wherein the second measurement result is triggered by the terminal device based on a B-series event.

12. The method according to claim 9, wherein the method further comprises:

before the terminal device sends the first measurement result and the second measurement result to the first network device, receiving, by the terminal device, indication information sent by the first network device, wherein the indication information is used for indicating the terminal device to send the second measurement result to the first network device;

wherein sending, by the terminal device, the first measurement result and the second measurement result to the first network device, comprises:

after receiving the indication information, sending, by the terminal device, the second measurement result to the first network device.

13. The method according to claim 9, wherein the measurement result of the third network device comprises a measurement result of all or part of cells of the third network device, and the measurement result of the fourth network device comprises a measurement result of all or part of cells of the fourth network device.

14. The method according to claim 9, wherein the method further comprises:

receiving, by the terminal device, a notification message sent by the first network device, wherein the notification message is used for notifying the terminal device of change information of at one of the third network device or the fourth network device; and changing, by the terminal device, at least one of the third network device or the fourth network device according to the notification message.

15. A terminal device, comprising:

a transceiver configured to:

receive a first measurement result, wherein the first measurement result comprises a measurement result of a first network device and a measurement result of a second network device, and the first network device and the second network device belong to a first communication system;

receive a second measurement result, wherein the second measurement result comprises at least one of a measurement result of a third network device and a measurement result of a fourth network device, the third network device and the fourth network device belong to a second communication system, the first communication system is a Long Term Evolution (LTE) system, and the second communication system is a New Radio (NR) system;

send the first measurement result and the second measurement result to the first network device;

receive indication information sent by the first network device before sending the first measurement result and the second measurement result to the first network device, wherein the indication information is used for indicating the terminal device to send the second measurement result to the first network device; and send the second measurement result to the first network device after receiving the indication information.

16. The terminal device according to claim 15, wherein the second measurement result is triggered by the terminal device based on a B-series event.

17. The terminal device according to claim 15, wherein the measurement result of the third network device comprises a measurement result of all or part of cells of the third network device, and the measurement result of the fourth network device comprises a measurement result of all or part of cells of the fourth network device.

* * * * *